United States Patent
Ozem et al.

(10) Patent No.: US 10,876,730 B2
(45) Date of Patent: Dec. 29, 2020

(54) COMBUSTOR PRIMARY ZONE COOLING FLOW SCHEME

(71) Applicant: Pratt & Whitney Canada Corp., Longueuil (CA)

(72) Inventors: Hayley Ozem, Mississauga (CA); Si-Man Amy Lao, Toronto (CA); Sri Sreekanth, Mississauga (CA); Jeffrey Verhiel, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 440 days.

(21) Appl. No.: 15/053,118

(22) Filed: Feb. 25, 2016

(65) Prior Publication Data

US 2017/0248311 A1   Aug. 31, 2017

(51) Int. Cl.
*F23R 3/00* (2006.01)
*F23R 3/06* (2006.01)

(52) U.S. Cl.
CPC .............. *F23R 3/002* (2013.01); *F23R 3/005* (2013.01); *F23R 3/06* (2013.01)

(58) Field of Classification Search
CPC .... F23R 3/002; F23R 3/04; F23R 3/06; F23R 3/10
See application file for complete search history.

(56) References Cited

U.S. PATENT DOCUMENTS

| | | | |
|---|---|---|---|
| 8,707,706 B2 * | 4/2014 | Garry | F23R 3/002 60/752 |
| 9,134,028 B2 * | 9/2015 | Stastny | F23R 3/04 |
| 9,194,585 B2 | 11/2015 | Cunha et al. | |
| 9,217,568 B2 * | 12/2015 | Cunha | F23R 3/06 |
| 2008/0264065 A1 * | 10/2008 | Gerendas | F23R 3/002 60/754 |
| 2013/0327056 A1 | 12/2013 | Cunha et al. | |
| 2014/0020393 A1 | 1/2014 | Nakamata et al. | |
| 2014/0216042 A1 | 8/2014 | Hanson | |
| 2014/0238031 A1 | 8/2014 | Okita et al. | |

* cited by examiner

*Primary Examiner* — Craig Kim
(74) *Attorney, Agent, or Firm* — Norton Rose Fulbright Canada LLP

(57) ABSTRACT

A gas turbine engine combustor has a shell defining a combustion chamber having a primary zone and a dilution zone downstream of the primary zone. The shell has an outer skin and an inner skin defining an air gap therebetween. The inner skin in the upstream portion of the primary zone is free from effusion holes and has heat transfer augmenters projecting from a back side thereof into the air gap. Effusion holes in the inner skin are only disposed downstream towards the tail end of the primary zone in order to delay the injection of any disruptive cooling air that could potentially interfere with the combustion process.

19 Claims, 3 Drawing Sheets

COMBUSTOR PRIMARY ZONE COOLING FLOW SCHEME

TECHNICAL FIELD

The application relates generally to gas turbine engines and, more particularly, to combustors.

BACKGROUND OF THE ART

In aviation gas turbine engines, the amount of air supplied for combustion and dilution may be optimized for operability and to minimize emissions such as oxides of nitrogen (NOx), carbon monoxide (CO), hydrocarbons (HC), etc. Therefore, it is often desirable that the amount of air supplied for cooling combustor walls be minimized and be disposed of with minimal impact on the combustion process, which poses several challenges. Particularly in small aero gas turbine engines, the total amount of air available for combustor wall cooling within the gas turbine thermodynamic cycle can be limited. Also, the injection of spent cooling air in the primary zone of the combustor may in certain circumstances interfere with the combustion process and, thus, result in higher pollutant emission and lower efficiency.

Therefore it is a challenge to ensure proper combustor wall cooling while not interfering with the combustion process.

SUMMARY

In one aspect, there is provided a combustor for a gas turbine engine, the combustor comprising: a shell defining a combustion chamber having a primary zone and a dilution zone downstream of the primary zone, the shell having an outer skin and an inner skin, the inner and outer skins defining an air gap therebetween, heat transfer augmenters projecting from the inner skin into the air gap, effusion holes extending through the inner skin downstream of the heat transfer augmenters, the inner skin being free from effusion holes over a portion surrounding an upstream half of the primary zone.

In another aspect, there is provided a combustor for a gas turbine engine, the combustor comprising: a shell defining a combustion chamber having a primary zone and a dilution zone downstream of the primary zone, the shell having an outer skin and an inner skin, the inner and outer skins defining an air gap therebetween, the primary zone having an upstream portion corresponding generally to the first 40% to 60% of the primary zone and a remaining downstream portion; in the upstream portion of the primary zone, the inner skin being free from effusion holes and having heat transfer augmenters projecting from a back side thereof into the air gap; and in the remaining downstream portion of the primary zone, the inner skin having effusion holes extending therethrough.

In a further aspect, there is provided a method for providing cooling to a gas turbine engine combustor having a combustor shell defining a combustion chamber, the combustion chamber having a primary zone where combustion occurs and a dilution zone downstream of the primary zone, the method comprising: cooling down an inner skin of the combustor shell by using a combination of impingement and convection cooling over an upstream half of the primary zone and a combination of impingement and effusion cooling over a remaining downstream half of the primary zone.

DESCRIPTION OF THE DRAWINGS

Reference is now made to the accompanying figures in which.

DETAILED DESCRIPTION

Figure 1:
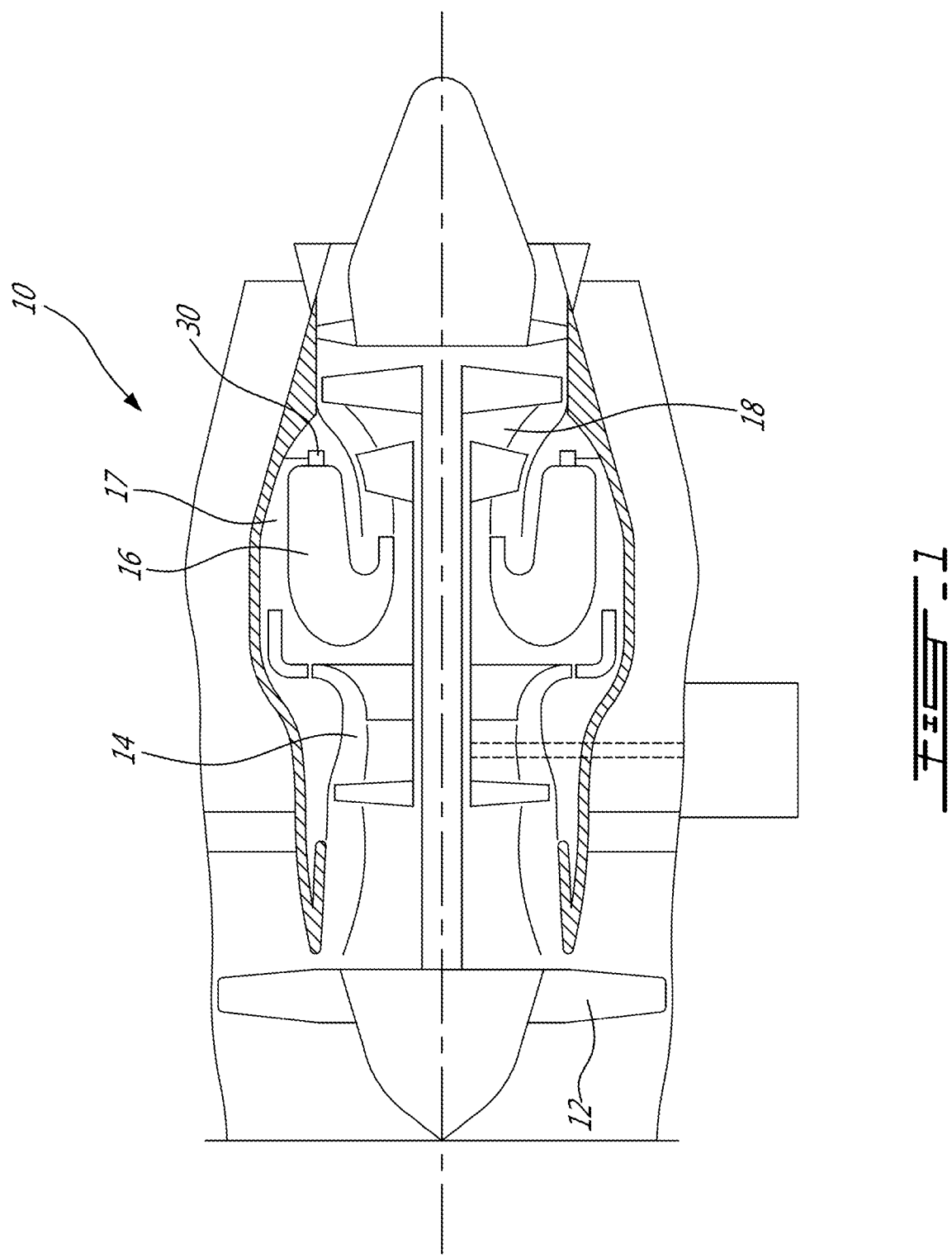
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
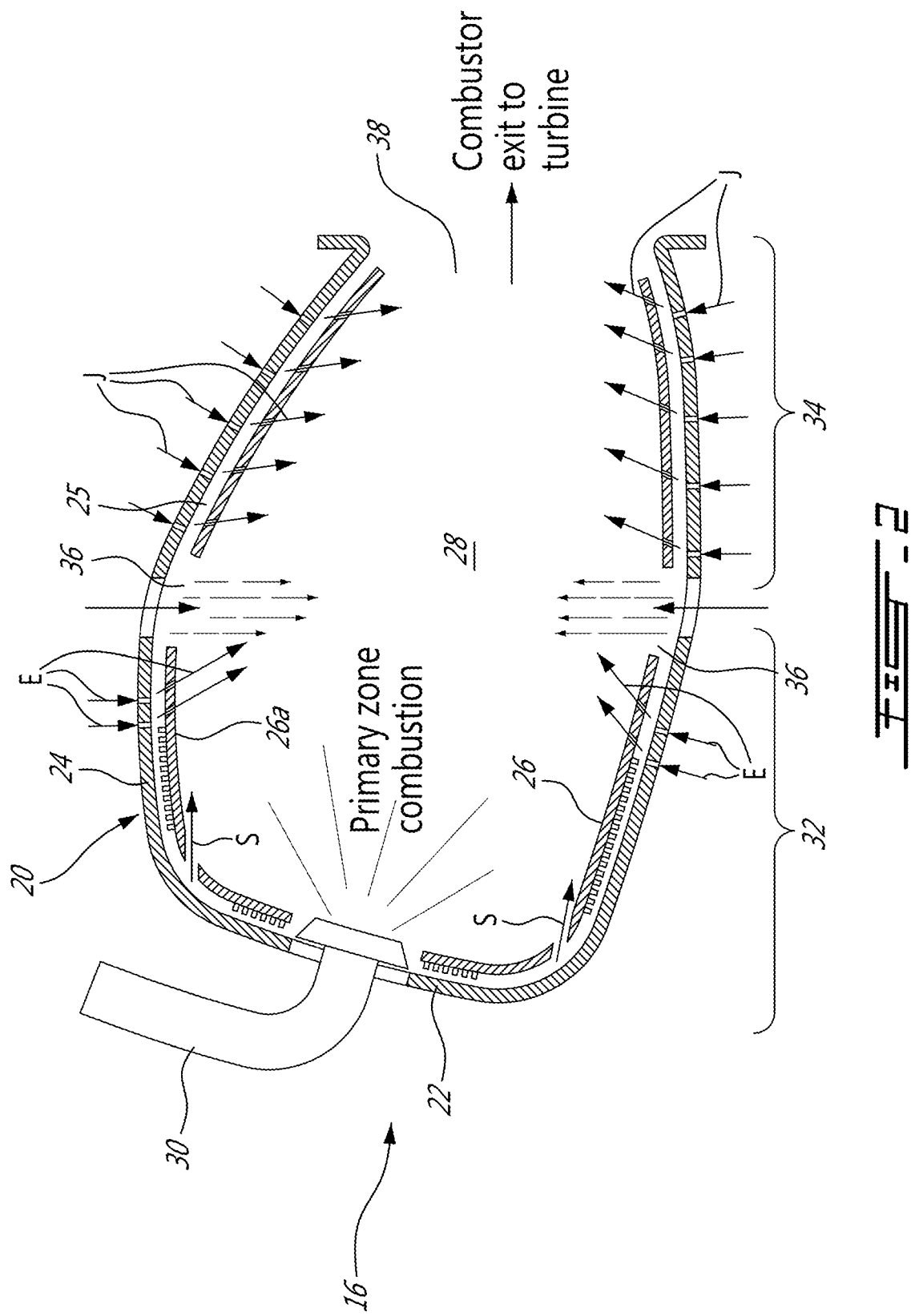
FIG. 2 is a simplified schematic view of a combustor of the engine shown in FIG. 1.

FIG. 2 is a simplified schematic view of the combustor 16. The exemplified combustor 16 has a double walled combustor shell 20 defining a combustion chamber 28. The combustor shell 20 comprises an outer skin 24 and an inner skin 26 extending from a dome 22. An air gap 25 is defined between the outer and inner skins 24, 26 for receiving cooling air (e.g. compressor bleed air). The inner skin 26 is typically provided in the form of heat shield panels 26a bolted or otherwise suitably mounted to the inner surface of the outer skin 24. A circumferential array of spaced-apart fuel nozzles 30 (only one of which is shown in FIG. 2) is provided at the dome 22 for injecting a mixture of fuel an air into the combustion chamber 28. The combustion takes place in the primary zone 32 of the combustion chamber 28. The combustion chamber 28 also has a dilution zone 34 downstream of the primary zone 32. The main role of the dilution zone 34 is to reduce the temperature of the combustion products and mix the resultant gases in order to establish a temperature that will uphold the integrity of the turbine blades downstream from the combustor 16. To that end a circumferential array of dilution holes 36 may be defined through the combustor shell 20 downstream of the primary zone 32. The dilution holes 36 are specifically designed to quench the combustion process. The dilution zone 34 extends from the dilution holes 36 to the outlet end 38 of the combustor 16.

Figure 3:
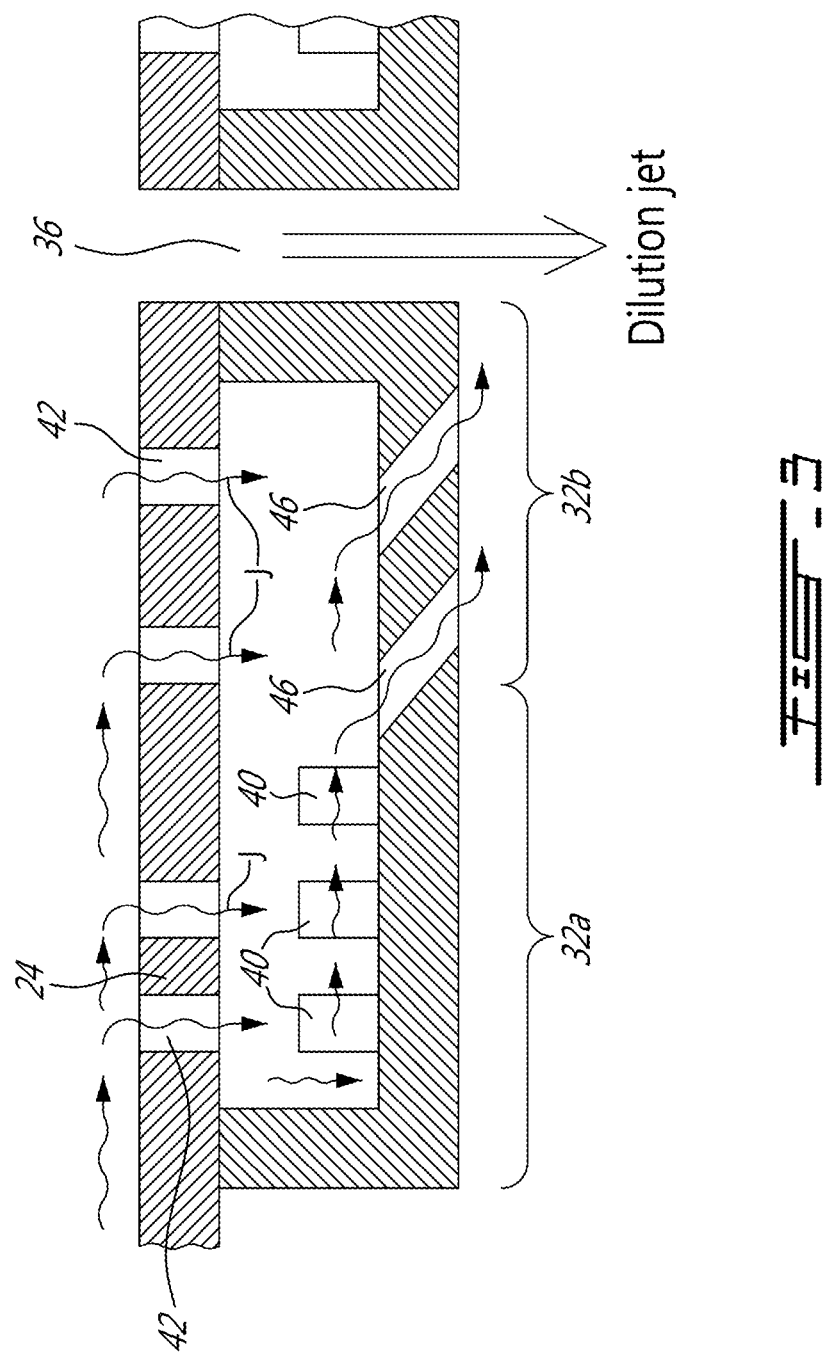
FIG. 3 is an enlarged view of a portion of the combustor shown in FIG. 2 and illustrating a pin fin and effusion hole arrangement in the primary zone of the combustion chamber of the combustor.

Referring concurrently to FIGS. 2 and 3, it can be appreciated that impingement holes 42 are defined in the outer skin 24 of the combustor shell 20 for directing impingement jets J against the back side of the inner skin 26 (e.g. the heat shield panels 26a). The impingement holes 42 may be distributed over the entire surface of the outer skin 24 to provide impingement cooling in the primary zone 32 as well as in the dilution zone 34.

Very high temperatures may be reached in the primary zone 32. Such high temperatures in the primary zone 32 may help lower emissions of unburned hydrocarbons (UHC) and carbon monoxide (CO) from the combustor 16. However, as a result, the combustor shell 20 and, more particularly, the front heat shield panels 26a forming the inner skin 26 in the primary zone 32 are subjected to very high heat loads. Therefore, more cooling air is typically required to cool the combustor shell 20 in the primary zone 32 than in the other regions of the combustor 16. This is challenging in that the amount of cooling air available is limited and in that the cooling air may negatively affect the combustion aerodynamic performance when released in the primary zone 32. For instance, releasing too much spent cooling air early in the primary zone 32 may have significant negative combustor aerodynamic impacts, such as higher pollutant emissions, lower efficiency, lower flame stability, etc. This is particularly true for small engine combustors where low combustion efficiency and unacceptably high production of carbon monoxide and unburned hydrocarbons represent significant design challenges.

As will be seen hereinafter, these challenges may be mitigated by removing effusion from the forward or upstream part 32a (FIG. 3) of the combustor primary zone 32 and using only effusion on the rear or downstream part 32b (FIG. 3) of the primary zone heat shield panels 26a. According to one embodiment, conventional effusion holes in the upstream part 32a of the primary zone heat shield panels 26a may be replaced by heat transfer augmenters, such as pin fins 40 (FIG. 3), trip strips, flow turbulators or the like, in order to ensure proper cooling of the effusion-free upstream part 32a of the primary zone heat shield panels 26a. Keeping the fins 40 in the front or upstream region of the heat shield panels 26a and effusion cooling in the back or downstream region reduce combustion quenching, thereby lowering HO/CO emissions. Indeed, applicant has found that the traditional placement of effusion holes throughout the primary zone 32 results in significant interaction of the spent cooling air with the primary combustion process resulting in local combustion quenching and the production of pollutants and low combustion efficiency.

Referring concurrently to FIGS. 2 and 3, it can be appreciated that the upstream part 32a of the heat shield panels 26a in the primary zone 32 is effusion-free and provided with pin fins 40. The pin fins 40 extend integrally from the back side of the heat shield panels 26a into the air gap 25. The back side pin fins 40 are used in the upstream part 32a of the heat shield panels 26a as a means to recover cooling capability due to the absence of effusion holes in this portion of the heat shield panels 26a. The height of the pin fins 40 may be selected to make up only a fraction of the air gap height. For instance, the pin fins 40 may only project half way through the air gap 25. The partial height of the pin fins 40 allows impingement cooling from the outer skin 24 to remain effective while further increasing the heat exchange surface area on the back side of the heat shield panels 26a, thereby enhancing convective heat removal. Combustor heat shields are notorious for cooling air leakages around its rim due to manufacturing tolerances, thermal warping of the shell/heat shield, and sometimes unevenly applied or insufficient clamping loads from the studs used to secure the heat shield to the outer skin of the combustor shell. The addition of half height pin fins does not rob any clamping force from the full height rails typically projecting from the back of the heat shields while providing additional cooling even in the event of these leakages.

The pin fins 40 can be grouped in local spots were additional cooling is required. Local hot spots, which occur frequently on combustors, lead to lower fatigue life due to the thermal mechanical stresses generated. In addition, these hot spots also have significantly reduced oxidation life, with one failure mode being a burn-through or perforation of the combustor shell 20. Pin fins 40 placed locally in hot zones on the cold-facing side (i.e. the back side) of the heat shield panels 26a may be used to reduce these metal temperatures and, thus, extend component life. This allows the existing amount of cooling air to perform with improved capability, extracting more heat, before entering the combustion chamber 28 for effusion film cooling and, eventually, participating in combustion.

According to one embodiment, the first roughly 40 to 60% of the primary zone heat shield panels 26a is effusion-free and cooled by impingement and pin fins. Therefore, according to this embodiment, it can be generally said that the upstream half of the primary zone heat shield panels is effusion free and provided with pin fins. According to this same embodiment, effusion holes 46 are solely provided in the downstream half (the remaining 60 to 40%) of the primary zone heat shield panels 26a. Effusion is, thus, delayed to the rearward 40 to 60% of the primary zone 32. As mentioned herein above, moving effusion towards the tail end of the primary zone 32 provides for improved CO/HO emissions for the combustion process because there is less primary zone quenching from the cooling air exhausted through effusion. With the effusion holes 46 at the rear, the cooling air exits very close or around the dilution holes 36 and, thus, the impact of the additional cooling air may be minimized.

Also, the placement of the primary zone panel effusion holes 46 far in the primary zone 32 downstream of the pin fins 40 enables the same volume of cooling air to pick up more heat before being exhausted into the combustion chamber 28, which leads to efficiency increased. According to the illustrated embodiment, no pin fins are provided in the downstream part 32a of the primary zone heat shield panels 26a.

In use, the cooling air (e.g. compressor bleed air) discharged in the air plenum 17 (FIG. 1) surrounding the combustor shell 20 convection cools the outer skin 24 of the combustor shell as it flows over the outer surface thereof and as it flows through the impingement holes 42 defined therethrough. As depicted by arrows J in FIGS. 2 and 3, the cooling air then impinges upon the back surface of the inner skin 26 to provide impingement cooling over substantially the entire surface of the inner skin 26. In the upstream portion 32a of the primary zone heat shield panels 26a, the cooling air after impinging upon the back side of the heat shield panels 26a flows in a downstream direction through the pin fins (fin cooling), thereby providing for enhance convection cooling of the effusion-free upstream portion 32a of the heat shield panels 26a. This flow of cooling air is only exhausted at the downstream end of the primary zone 32 (convection cooling is further enhanced due to the longer travel distance of the flow before being exhausted) together with the air impinging upon the downstream portion 32b of the primary zone heat shield panels 26a via the effusion holes 46 defined in the downstream portion 32b of the panels 26a. Accordingly, the downstream portion 32b of the primary zone heat shield panels 26a is cooled by a combination of impingement and effusion (transpiration and film cooling), whereas the upstream portion 32a of the panels 26a is cooled by a combination of impingement and convection (fin cooling). The spent cooling air exhausted through the effusion holes 46 is then used to provide film cooling over the hot inner surface of the heat shield panels 26a. A portion of the air used to cool the dome 22 may also be leaked to form a starter film S over the hot inner side of the front heat shield panels 26a. By delaying effusion towards the tail end of the primary zone 32, as schematically depicted by arrow E in FIG. 2, the integrity of the starter film S may be more easily preserved.

From the foregoing, it can be appreciated that in contrast to conventional designs incorporating effusion cooling throughout the primary zone, it is herein contemplated to cool the upstream half with a starter film, impingement and pin fins; and to delay effusion to the downstream half of the heat shields. By so removing a large part of the primary zone effusion, it may be possible to gain emission and combustion performance benefits.

The above description is meant to be exemplary only, and one skilled in the art will recognize that changes may be made to the embodiments described without departing from the scope of the invention disclosed. For example, fins can be made of varying shapes and sizes. Grouping can take the form of specific patterns to better direct cooling air and/or shaped to match the target hot spot. Fins may also be used without impingement sheet for enhanced back-side cooling (compared to something like pure effusion) and further weight reduction. Still other modifications which fall within the scope of the present invention will be apparent to those skilled in the art, in light of a review of this disclosure, and such modifications are intended to fall within the appended claims.

The invention claimed is:

1. A combustor for a gas turbine engine, the combustor comprising: a shell defining a combustion chamber having a primary zone and a dilution zone downstream of the primary zone, the shell having an outer skin and an inner skin, the inner and outer skins defining an air gap therebetween, the inner skin detachably mounted to the outer skin, the primary zone having heat transfer augmenters projecting from the inner skin into the air gap, the primary zone having effusion holes extending through the inner skin downstream of the heat transfer augmenters, the inner skin being free from effusion holes over a 40 to 60% portion of a total length of the primary zone, thereby forming a free effusion hole portion in the primary zone, the heat transfer augmenters being solely provided in the free effusion hole portion, the free effusion hole portion extending from an upstream edge of the inner skin, the free effusion hole portion in serial flow communication with the effusion holes with the heat transfer augmenters positioned upstream of the effusion holes in the primary zone.

2. The combustor defined in claim 1, wherein the effusion holes are located adjacent to a circumferential array of dilution holes extending through the shell at an interface between the primary zone and the dilution zone.

3. The combustor defined in claim 1, wherein impingement holes are defined in the outer skin over substantially a full extent of the primary zone, thereby providing for a combination of impingement and convection cooling of the inner skin in the upstream portion of the primary zone and a combination of impingement and effusion cooling in a downstream portion of the primary zone.

4. The combustor defined in claim 1, wherein the heat transfer augmenters are provided in the form of pin fins grouped in local spots where additional cooling is required.

5. The combustor defined in claim 1, wherein the heat transfer augmenters are provided in the form of pin fins, the pins fins projecting only partly through the air gap.

6. The combustor defined in claim 1, wherein no heat transfer augmenters are provided in a downstream half of the primary zone, the downstream half having a length corresponding to about half of a total length of the primary zone.

7. A method of providing cooling to a gas turbine engine combustor having a combustor shell defining a combustion chamber, the combustion chamber having a primary zone where combustion occurs and a dilution zone downstream of the primary zone, the method comprising: cooling down an inner skin of the combustor shell by using a combination of impingement and convection cooling over an upstream portion of the primary zone and a combination of impingement and effusion cooling over a remaining downstream portion of the primary zone, the upstream portion corresponding to the first 40 to 60% of the primary zone, the inner skin detachably mounted to an outer skin defining a plurality of impingement holes, and wherein the upstream portion is free from effusion holes and provided with heat transfer augmenters, the heat transfer augmenters being in serial flow communication with the effusion holes, the heat transfer augmenters positioned upstream of the effusion holes.

8. A combustor for a gas turbine engine, the combustor comprising: a shell defining a combustion chamber having a primary zone and a dilution zone downstream of the primary zone, the shell having an outer skin and an inner skin, the inner and outer skins defining an air gap therebetween, the inner skin detachably mounted to the outer skin, the primary zone having an upstream portion corresponding generally to the first 40% to 60% of the primary zone and a remaining downstream portion; in the upstream portion of the primary zone, the inner skin being free from effusion holes and having heat transfer augmenters projecting from a back side thereof into the air gap; and in the remaining downstream portion of the primary zone, the inner skin having effusion holes extending therethrough.

9. The combustor defined in claim 8, wherein the heat transfer augmenters are distributed over the upstream portion of the primary zone, the downstream portion having no heat transfer augmenters.

10. The combustor defined in claim 8, wherein the effusion holes are located adjacent to a circumferential array of dilution holes extending through the shell at an interface between the primary zone and the dilution zone.

11. The combustor defined in claim 8, wherein impingement holes are defined in the outer skin over substantially a full extent of the primary zone, thereby providing for a combination of impingement and convection cooling of the inner skin in the upstream portion of the primary zone and a combination of impingement and effusion cooling in the downstream portion of the primary zone.

12. The combustor defined in claim 8, wherein the heat transfer augmenters are provided in the form of pin fins grouped in local spots where additional cooling is required.

13. The combustor defined in claim 8, wherein the heat transfer augmenters are provided in the form of pin fins, the pins fins projecting only partly through the air gap.

14. The combustor defined in claim 8, wherein the inner skin comprises heat shield panels mounted to the outer skin in the primary zone, the heat transfer augmenters being provided on an upstream half of the heat shield panels, the effusion holes being provided in a downstream half of the heat shield panels, the upstream half and the downstream half respectfully corresponding to half of the size of the primary zone.

15. The method of claim 7 further comprising:
using cooling air to cool a dome of the gas turbine engine combustor, leaking a portion of the cooling air from the dome to provide a starter film over an inner side of the upstream portion the inner skin, and protecting an integrity of the starter film by delaying effusion cooling to the downstream portion of the primary zone.

16. The method of claim 7, comprising exhausting spent cooling air from the upstream portion of the primary zone via the effusion holes provided in the downstream portion of the primary zone.

17. The method of claim 7, comprising exhausting spent cooling flow from the upstream portion and the downstream portion of the primary zone into the combustion chamber at a location adjacent to dilution holes defined in the combustor shell between the primary zone and the dilution zone.

18. The method of claim 7, wherein the heat transfer augmenters comprise pin fins projecting from a back side of the inner skin, and wherein the method comprises causing cooling air to flow through the pin fins projecting from the back side of the inner skin in the upstream portion of the primary zone before being discharged through the effusion holes provided in the downstream portion of the primary zone.

19. The combustor defined in claim 1, wherein the upstream edge of the inner skin is spaced from a dome of the shell to define a starter film gap, the starter film gap fluidly connected to a source of cooling air of the dome, the starter film gap aligned with an inner side of the inner skin to allow for the formation of a starter film over the inner side.

* * * * *